3,489,010
FOIL-TYPE VACUUM GAUGE
William Peter Teagan, Billerica, Mass., assignor to Thermo Electron Corporation, Waltham, Mass., a corporation of Delaware
Filed Sept. 10, 1968, Ser. No. 758,754
Int. Cl. G01l 21/14
U.S. Cl. 73—399                          6 Claims

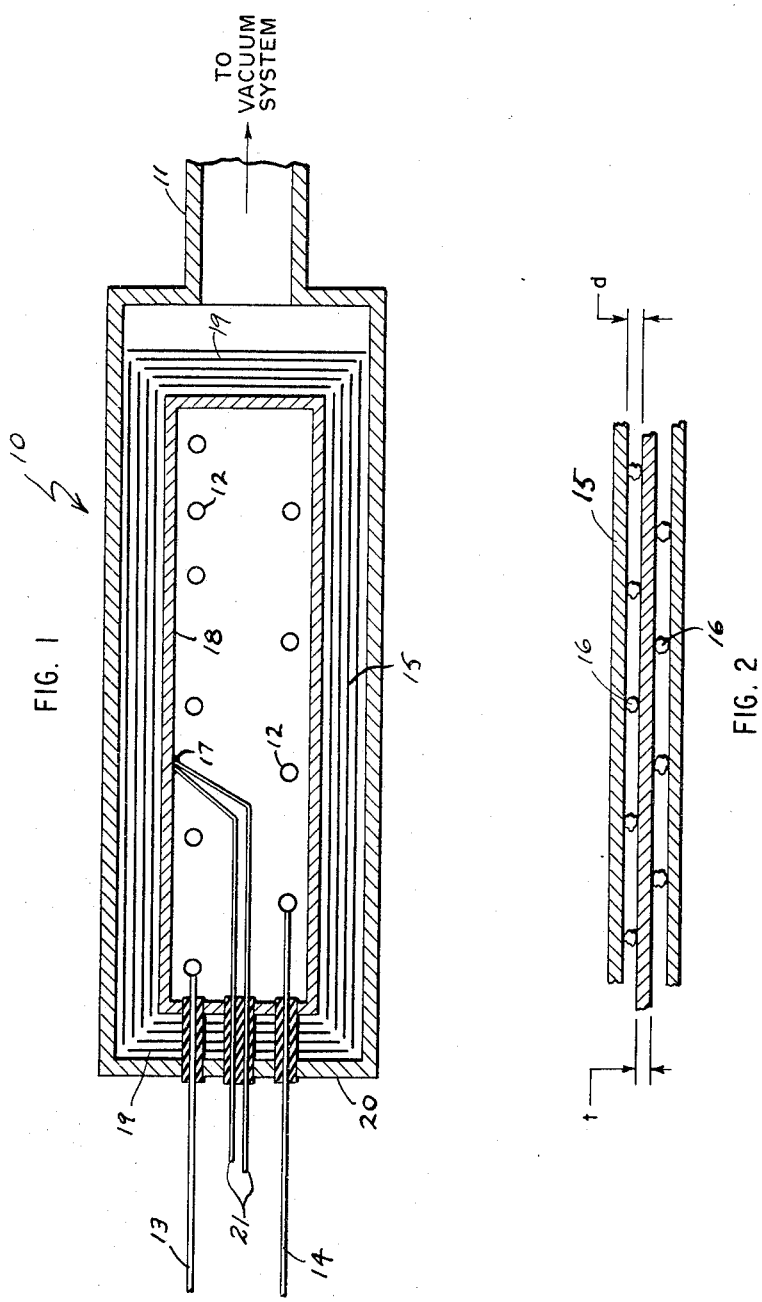

ABSTRACT OF THE DISCLOSURE

An instrument for incorporation in a vacuum system to measure pressure in the system which includes an enclosed plurality of foils closely spaced from one another by poor thermal conductors. The foils surround a heater and a thermocouple is attached to the wall of the innermost foil. Pressure is measured as a function of the conduction heat transfer through the foil insulation.

---

Commercially available thermocouple and Pirani gauges are generally accurate to pressures of about 1 or 2 torr. There have been some recent developments, however, that have extended the range of such gauges to as high as 20 to 100 torr. Nevertheless, there has been a definite lack of gauges of the thermocouple type which are capable of operation above 100 torr and even these have only marginal sensitivity in the 5 to 100 torr range.

Typically, known thermal gauges consist of a tube closed at one end through which a resistance wire of known electrical properties is sealed. Generally, the wire extends centrally of the tube towards the open end and is energized at its ends by a constant power input. A thermocouple also is sealed through the closed end and contacts the wire at an intermediate point to measure the temperature of the wire. The open end of the tube, of course, is in direct communication with the vacuum system.

In operation the resistance wire is supplied with a known power input and its temperature is read from a suitable gauge connected to the thermocouple. Within limits, the temperature is a function of the pressure. By means of suitable tables or charts the pressure can be readily determined.

At pressures sufficiently low that the molecular mean free path is less than the internal diameter of the tube, the heat conduction through the gas is actually proportional to pressure. However, as pressure is increased, the dependence of the conduction heat transfer on gas pressure becomes less rigorous until the continuum is reached where gas conduction heat transfer becomes independent of pressure. Expressed mathematically, this occurs when $D/\lambda \gg 1$, where $D$ is the internal tube diameter and $\lambda$ is the molecular free path.

As a practical matter, it becomes most difficult to string a wire suitably through a tube having an internal diameter as small as 0.04" (0.1 cm.). Yet, at these dimensions, at a pressure of about 1 torr, $D/\lambda$ is about 15 which means that the continuum limit is approached. It is the principal object of this invention to overcome the practical problems outlined and extend the operating range of such gauges to near-atmospheric pressures.

A further object is to increase the sensitivity of thermocouple gauges over a wide range of pressures.

These and other objects are attained by using a heater of known capacity and surrounding the heater with a plurality of extremely thin foils separated from each other by distances as small as approximately 0.0002". A thermocouple is preferably in contact with the inner surface of the innermost foil.

The invention is best understood by reference to the accompanying drawing in which:

FIG. 1 is a sectional elevation of one embodiment of the invention, and

FIG. 2 is an enlarged, fragmentary view of a portion of FIG. 1.

Referring to FIGS. 1 and 2, the gauge includes a tube 10 closed at one end 20 and open at the other end. The open end may be provided with a tubulation 11 for connection to and communication with a vacuum system. A suitable coil heater 12 is inserted within tube 10 and provided with power input leads 13 and 14 sealed through the closed end 20. The leads are for connection to a conventional power source (not shown), which provides a constant power input. A plurality of thin films 15, each of thickness $t$, is provided in the form of nested sleeves around the heater. The sleeves are separated a distance $d$, one from another, by insulating elements 16. A pair of output leads 21 to a gauge (not shown) for a thermocouple 17 are also sealed through the closed end 20. The thermocouple is held in close contact with the inner wall 18 of the innermost foil. The cylindrical package formed of the foils may be supported at the ends by suitable insulating plugs 19.

The heater 12 may be a standard coiled sheath heater of known capacity. The power source may be entirely conventional in nature.

The tube 10 may be of any suitable material capable of withstanding the conditions of temperature and vacuum involved in making the measurements. Of course, it is also desirable that it be capable of being sealed to the vacuuum system in which pressure is to be measured. The foil 15 may be of nickel, platinum, tantalum or other metal, or metallized plastic alloy that can be obtained in a thickness ranging downward from 0.002".

The preferred form of material 16 as seen in FIG. 2 and used as a separator to maintain a gap between the foils is of refractory oxide particles such as zirconia oxide or thoria oxide. The particles should be fairly widely dispersed and randomly oriented along the foils to permit free gas flow between foils. That is to say, the separators must not divide the gaps into a series of closed compartments. Another form of separator capable of use in the invention is a wire wound spirally around each film so that a spiral passage is maintained from the vacuum source to the closed end 20. Nichrome or other wires of low heat conductivity may be used. Generally, relatively poor heat conductors capable of maintaining a gap between foils of less than 0.0002" to 0.001" without blocking gas passage are suitable as foil separators. The end plugs 19 may be of insulating material such as Dynaquartz and, of course, the plug at the open end of the tube 10 should be perforated to permit the flow of gas.

Essentially, gauges built in accordance with the present invention depend for their superior operation upon a novel approach to setting the characteristic length which determines the pressures at which free molecule conduction and transitional heat conduction are present. In the gauge of the invention the caracteristic length $d$ is the distance between foils, approximately 0.0002" to 0.001", whereas in conventional gauges, the length is related to the internal tube diameter which is about 0.04" to 0.05". Another point of importance concerns heat losses which may result from radiation loss and end losses. These should be minimized to make certain that, in total, they are not large in comparison to the conduction heat transfer. Using, for example, 20 layers of nickel foil and zirconia oxide separators in the dimensions noted above, the ratio of radiation and end losses to conduction heat transfer is unity at pressures of about 20 microns. Hence, operation at pressures of about 5 microns is possible with such design. Minor improvements in insulation make possible pressure readings in the range of one micron.

The nature of the design provides a structure which is rugged and operable in temperatures as low as 100–200° C. although the great variety of possible construction materials for the foil, heater and separator permit use of the gauge over wider temperature ranges.

The basic action of the gauge in indicating pressure stems from the fact that, for a given input to the heater wire, the temperature of the innermost foil cylinder is a function of system pressure. This has proven to hold true up to near-atmospheric pressure in an experimental form of the gauge of the invention.

Although what has been disclosed constitutes a preferred embodiment of the present invention, various modifications and alternatives within the scope of the invention will suggest themselves to those skilled in the art upon a reading of the foregoing specification. Such alternatives and modifications are believed to be within the purview of the invention.

What is claimed is:

1. A vacuum gauge for measuring pressure in a system comprising an enclosure incorporated in said system for communication therewith, a heating element disposed in said enclosure, relatively good thermally conductive members within said enclosure disposed about and spaced from said heating element, relatively poor thermally conductive members being interposed between said relatively good thermally conductive members, and means for measuring the temperature of the one of said relatively good thermally conductive members disposed closest to said heating element, said temperature being a function of the pressure in said enclosure and in said system.

2. A vacuum gauge as defined in claim 1 wherein said relatively good thermal conductors comprise concentric metallic foils.

3. A vacuum gauge as defined in claim 2 wherein the spacing between said concentric metallic foils is sufficiently small that free molecule heat conduction and transitional heat conduction occur at pressures approaching atmospheric.

4. A vacuum gauge as defined in claim 2 wherein the spacing between said foils is maintained between approximately 0.0002″ and 0.001″.

5. A vacuum gauge as defined in claim 2 wherein said concentric metallic foils comprise a plurality of sleeves of thickness of approximately 0.0001″ to 0.001″.

6. A vacuum gauge as defined in claim 5 wherein said enclosure comprises a generally cylindrical tube having an open end communicating with said vacuum system and a closed end, said foils being disposed adjacent the inner wall of said tube, a thermocouple disposed in contact with the innermost of said foils, means for providing a predetermined power input to said heater also sealed through said closed end, and means also sealed through said closed end for deriving an output of said thermocouple as a func- said enclosure and in said system.

References Cited

UNITED STATES PATENTS 2,736,200   2/1956   Kleimack et al. _____ 73—399

DONALD O. WOODIEL, Primary Examiner

PO-1050
(5/69)

UNITED STATES PATENT OFFICE
CERTIFICATE OF CORRECTION

Patent No. 3,489,010          Dated January 13, 1970

Inventor(s) William Peter Teagan

It is certified that error appears in the above-identified patent and that said Letters Patent are hereby corrected as shown below:

In claim 6, column 4, lines 23-24 should read as follows:

function of pressure in said system

SIGNED AND SEALED
APR 28 1970

(SEAL)
Attest:

Edward M. Fletcher, Jr.
Attesting Officer

WILLIAM E. SCHUYLER, JR.
Commissioner of Patents